B. K. LAMB.
WIRE CABLE FASTENER.
APPLICATION FILED MAR. 23, 1911.
1,022,954. Patented Apr. 9, 1912.
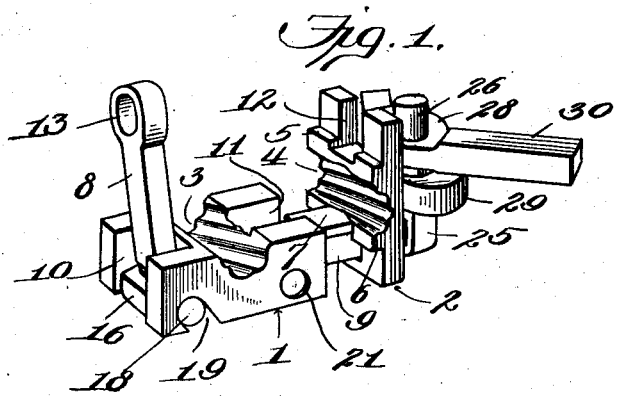
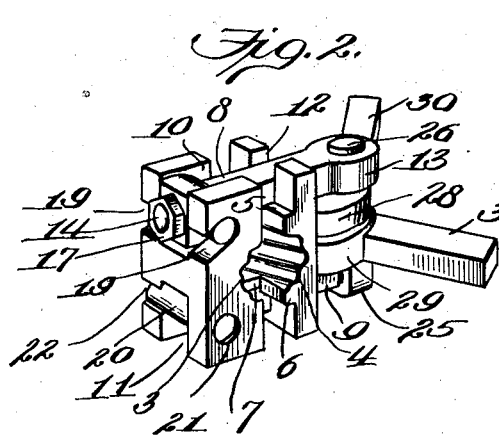
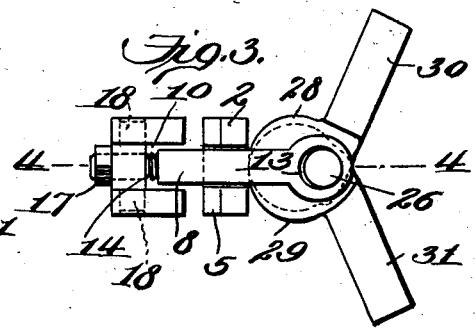
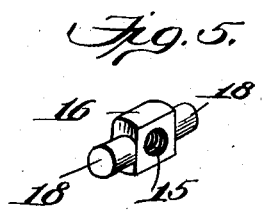
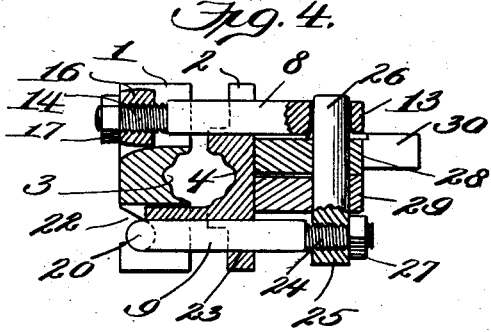
Witnesses:
Inventor
Bruce K. Lamb

UNITED STATES PATENT OFFICE.

BRUCE K. LAMB, OF BEMIS, WEST VIRGINIA.

WIRE-CABLE FASTENER.

1,022,954.  Specification of Letters Patent. Patented Apr. 9, 1912.

Application filed March 23, 1911. Serial No. 616,432.

*To all whom it may concern:*

Be it known that I, BRUCE K. LAMB, a citizen of the United States, residing at Bemis, in the county of Randolph and State of West Virginia, have invented new and useful Improvements in Wire-Cable Fasteners, of which the following is a specification.

The present invention has reference to improvements in wire cable fasteners, and it comprehends, generally, the provision of a fastener of the type indicated, the construction and aggroupment of whose component parts are such as to insure efficiency and facility of operation, and, in particular, a maximum clamping action, as well as a complete detachment of said parts from each other, to permit the ready substitution of a new part for one which has become worn or mutilated.

A structural embodiment of the invention is illustrated in the accompanying drawing, wherein—

Figures 1 and 2 are perspective views of the improved fastener, showing the clamping members thereof in open and closed positions, respectively; Fig. 3 is a plan view of Fig. 2; Fig. 4 is a vertical section taken approximately on the line 4—4 of Fig. 3; and Fig. 5 is a perspective view of the cross-piece carried by one of the connecting bolts.

As shown in said drawing, the device comprises, essentially, a pair of clamping members 1 and 2 constituted by blocks of suitable material whose mutually-adjacent inner faces are formed with spirally-corrugated concave gripping seats or recesses 3 and 4 for the cable arranged transversely thereof, the upper block 2 being preferably provided with a pair of transversely-disposed integral lugs 5 and 6. The inner faces of these lugs form continuations of the corrugated side walls of the seat 4, and the lug 6 is provided with a laterally-extending centrally-located tongue 7. To connect and lock the said blocks 1 and 2 together, a substantially T-shaped locking bolt 8 and a similarly-shaped pivot or hinge bolt 9 are preferably employed, both ends of block 1 and one end of block 2 being longitudinally slotted or bifurcated, as indicated by the numerals 10, 11 and 12, to facilitate the mounting and operation of the bolts. The squared shank portion of the locking bolt 8 terminates at one end in an eye 13, while its other end 14 is reduced and threaded, and is designed to fit in the threaded aperture 15 formed in the body portion of the adjustable and removable cross-piece 16, which latter is disposed within the slot 10 at the front end of block 1 and is maintained in position by a nut 17. To admit of the detachable connection of this bolt to said block, its cross-piece is provided at opposite ends with trunnions 18 that fit loosely in rearwardly and downwardly inclined recesses 19 in the legs produced by the formation of the slot just referred to, said recesses opening through the bottom surfaces of said legs as shown in Figs. 1 and 2.

The pivot or hinge bolt 9 is likewise detachably connected to block 1, and its cross-piece 20 extends across slot 11 and has one of its ends journaled in an aperture 21 formed in one of the legs produced by the formation of said slot, and its other end loosely fitted in a recess 22, similar to the recesses 19, formed in the other leg. Said bolt carries the upper block 2, the latter being provided with a rectangular aperture 23 through which the squared bolt shank loosely extends, this aperture being so positioned as to permit tongue 7 to rest squarely against the adjacent face of said shank. (See Figs. 1, 2 and 4.) The free or rear end 24 of the bolt in question is reduced and threaded, and is designed to extend through the eye 25 provided upon one end of a third bolt 26 whose free end is adapted to be inserted through the eye 13 of bolt 8. The threaded end 24 of bolt 9 is also provided with an adjusting nut 27.

The construction and arrangement of the parts above described is such, therefore, that the pivot or hinge bolt 9 may be swung upwardly from the position shown in Fig. 1, into a position wherein the block 2 will overlie block 1, and the portion of the locking bolt 8 directly adjacent its eye 13 will extend through slot 12, which latter is of less width than said eye, whereupon the free end of bolt 26 may be inserted through said eye, thus holding the two blocks in closed position. Also, it will be observed that when the parts are in the position shown in Fig. 1, bolt 8 may readily be detached from its cross-piece 16, after which the latter may be removed from block 1, while the bolt 9 may likewise be detached from said block, and the bolt 26 and block 2 may then be removed, in turn, from bolt 9. The assemblage or disassemblage of the parts can be quickly and readily effected, and any one of said parts on becoming worn or mutilated can be replaced by a new part.

In order to obtain the requisite clamping pressure upon block 2, a pair of eccentrics 28 and 29 provided, respectively, with handles 30 and 31, are preferably employed. These eccentrics are rotatably mounted on bolt 26 and, when turned in the proper direction, will bear against the upper block 2 and force the same bodily toward block 1, thereby clamping the cable or rope, (not shown), in its mating seats 3 and 4, the desired variations in pressure being effected through the medium of the adjusting nuts 17 and 27. The aforesaid eccentrics may likewise be removed from bolt 26, when worn or injured, and replaced by new ones.

I claim as my invention:

1. The combination of a clamping member; a swinging member connected thereto; a clamping member slidable laterally on the swinging member and arranged to swing with the same into operative position with relation to the first-named clamping member; means for forcibly sliding the second-named clamping member bodily along said swinging member toward said first-named clamping member into operative position with relation to the latter; and means carried by said first-named clamping member for locking said second-named member in such position.

2. The combination of a clamping member; a swinging member connected thereto; a clamping member slidable laterally on the swinging member and arranged to swing with the same into operative position with relation to the first-named clamping member; means for forcibly sliding the second-named clamping member bodily along said swinging member toward said first-named clamping member into operative position with relation to the latter; and means carried by said first-named clamping member and arranged for engagement with the last-mentioned means for locking said second-named member in such position.

3. The combination of a pair of clamping blocks provided with mating gripping seats; a bolt pivoted to one block and having the other block mounted thereon for lateral sliding movement; means connected to said bolt for forcibly sliding the slidable block bodily toward the first-named block; a support whereon said forcing means are mounted and a locking bolt pivoted to said first-named block and arranged for swinging movement into position for engagement with said support.

4. The combination of a pair of clamping blocks; a hinge bolt and a locking bolt pivoted to one block, said hinge bolt having the other block mounted thereon for lateral sliding movement; a member connected to said hinge bolt and arranged for direct engagement with said locking bolt, for retaining the second-named block in operative position with relation to said first-named block; and means carried by said member for forcing said second-named block to slide bodily along said hinge bolt toward said first-named block.

5. The combination of a pair of clamping blocks; a hinge bolt and a locking bolt pivoted to one block, said hinge bolt having the other block mounted thereon for lateral sliding movement and said locking bolt being provided at one end with an eye; a bolt connected at one end to said hinge bolt and having its opposite end adapted for insertion through said eye, for retaining said second-named block in operative position with relation to said first-named block; and means carried by the third-named bolt for forcing said second-named block to slide bodily along said hinge bolt toward said first-named block.

6. The combination of a pair of clamping blocks; a hinge bolt and a locking bolt detachably pivoted to one block, said hinge bolt having the other block slidably and detachably mounted thereon; a member detachably connected to said hinge bolt and arranged for direct engagement with said locking bolt for retaining the second-named block in operative position with relation to the first-named block; and means carried by said member for forcing said second-named block to slide bodily along the said hinge bolt toward said first-named block.

7. The combination of a pair of clamping blocks, one of which is formed with a longitudinal slot at each end, the other block having a longitudinal slot formed in one end and an aperture adjacent the other end; a pair of T-shaped bolts having their cross-pieces pivotally mounted in the walls of the slots in the first-named block, one of said bolts having its stem extending loosely through the aperture in the second-named block to permit the latter to slide thereon; a member connected to the projecting end of the stem of that bolt and arranged for direct engagement with the end of the stem of the other bolt, for retaining the second-named block in operative position with relation to the first-named block, the second-named bolt having its stem extending through the slot in the second-named block; and means carried by said member for forcing said second-named block to slide bodily along the first-named bolt toward said first-named block.

8. The combination of a pair of clamping blocks, one of which is formed with a longitudinal slot at each end, the other block having a longitudinal slot formed in one end and an aperture adjacent the other end; a pair of T-shaped bolts having their cross pieces pivotally and detachably mounted in the walls of the slots in the first-named block, one of said bolts having a stem extending loosely through the aperture in the second-named block to permit the latter to slide thereon, the other bolt having the free end of its stem terminating in an eye; a member connected at one end to the projecting end of the stem of the first-named bolt and having its opposite end inserted through said eye, for retaining the second-named block in operative position with relation to the first-named block, the second-named bolt having its stem extending through the slot in the second-named block; and a pair of eccentrics carried by said member for forcing said second-named block to slide bodily along said second-named bolt toward said first-named block.

In testimony whereof I have hereunto set my hand in presence of two subscribing witnesses.

BRUCE K. LAMB.

Witnesses:
J. N. KOCHENDEEFER,
EULA JACKSON.

Copies of this patent may be obtained for five cents each, by addressing the "Commissioner of Patents. Washington, D. C."